United States Patent
Freer (10) Patent No.: US 12,031,473 B2
(45) Date of Patent: Jul. 9, 2024

(54) AIRCRAFT PROPULSION SYSTEM WITH INTERMITTENT COMBUSTION ENGINE, HYDRAULIC MOTOR, AND COOLING SYSTEM

(71) Applicant: Pratt & Whitney Canada Corp., Longueuil (CA)

(72) Inventor: Richard Freer, Saint Basile-le-Grand (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/971,239

(22) Filed: Oct. 21, 2022

(65) Prior Publication Data

US 2024/0133335 A1    Apr. 25, 2024

(51) Int. Cl.
  *F01P 7/16*   (2006.01)
  *F01P 11/08*  (2006.01)
  *F01P 7/14*   (2006.01)

(52) U.S. Cl.
  CPC ......... *F01P 7/16* (2013.01); *F01P 11/08* (2013.01); *F01P 2007/146* (2013.01); *F01P 2050/20* (2013.01)

(58) Field of Classification Search
  CPC ........ F01P 7/16; F01P 11/08; F01P 2007/146; F01P 2050/20; F01P 7/12; F01P 3/20; F01D 15/10; F01D 15/12; F02C 3/073; B60K 6/12
  See application file for complete search history.

(56) References Cited

U.S. PATENT DOCUMENTS

| | | |
|---|---|---|
| 3,211,399 A | 10/1965 | Eickmann |
| 10,967,981 B2 | 4/2021 | Hughes |
| 2011/0120396 A1* | 5/2011 | Myers ............ F16H 57/0413 123/41.08 |
| 2015/0315956 A1* | 11/2015 | Alm .................. F01P 7/12 123/41.31 |
| 2018/0037332 A1 | 2/2018 | Hughes |

(Continued)

FOREIGN PATENT DOCUMENTS

CN    109515728 A * 3/2019 ............ B64D 33/10

OTHER PUBLICATIONS

EP Search Report for EP Patent Application No. 23205354.6 dated Feb. 12, 2024.

*Primary Examiner* — Syed O Hasan
(74) *Attorney, Agent, or Firm* — Getz Balich LLC (57) ABSTRACT

An aircraft propulsion system and method of cooling the same are provided. The system includes a hydraulic pump, an intermittent IC engine, a hydraulic motor, an engine oil pump, and a cooling system. The intermittent IC engine drives the hydraulic pump. The hydraulic motor is powered by the hydraulic pump and drives a propulsor fan. The cooling system includes a first heat exchanger (AIR-EO HEX) and a second heat exchanger (EO-HF HEX). The AIR-EO HEX transfers heat between flows of engine oil and ambient air. The EO-HF HEX transfers heat between flows of engine oil and hydraulic fluid. The hydraulic pump provides motive force to cause the hydraulic oil to pass through the EO-HF HEX and back to the at least one hydraulic pump. The engine oil pump provides motive force to pass the engine oil to and through the AIR-EO HEX, the EO-HF HEX, and the intermittent IC engine.

18 Claims, 8 Drawing Sheets

(56) References Cited

U.S. PATENT DOCUMENTS

| | | |
|---|---|---|
| 2018/0170569 A1 | 6/2018 | Brodeur |
| 2018/0306147 A1 | 10/2018 | Bruno |
| 2019/0256214 A1 | 8/2019 | Dionne |
| 2020/0283139 A1 | 9/2020 | Brand |
| 2020/0307811 A1 | 10/2020 | Shang |
| 2021/0164403 A1* | 6/2021 | Krzywon ............... B64C 11/38 |

* cited by examiner

AIRCRAFT PROPULSION SYSTEM WITH INTERMITTENT COMBUSTION ENGINE, HYDRAULIC MOTOR, AND COOLING SYSTEM

BACKGROUND OF THE INVENTION

1. Technical Field

The present disclosure relates to hybrid-powered aircraft propulsion systems and methods for operating the same.

2. Background Information

An aircraft such as a business jet may fly at relatively high altitudes to reduce aircraft drag and at relatively high speeds to decrease flight time. Therefore, engine power and engine efficiency at high altitudes is a relatively important factor when selecting a propulsion system engine for a typical business jet.

A typical business jet includes at least one small gas turbine engine for propulsion. A small gas turbine engine is lighter than other types of internal combustion engines; e.g., a reciprocating piston engine. However, a small gas turbine engine is relatively fuel inefficient when compared to other types of internal combustion engines. A gas turbine engine may also be subject to power loss as the altitude of the aircraft powered by the gas turbine engine increases.

Intermittent internal combustion (IC) engines such as a rotary engine (e.g., a Wankel type rotary engine), a reciprocating piston engine, and other constant volume internal combustion engines have been used as an alternative power source for aircraft. There are benefits and disadvantages relating to both intermittent IC engines and small gas turbine engines. On the one hand, intermittent IC engines are often less expensive than a typical gas turbine engine and can be relatively fuel efficient when compared to a small gas turbine engine. On the other hand, the fuel efficiency of intermittent IC engines is often offset by the intermittent IC engine having a greater weight than a small gas turbine engine. Hence, to realize the fuel efficiency the intermittent IC engine, it is often necessary for an aircraft powered by an intermittent IC engine powered aircraft to fly for a relatively long mission duration; i.e., over a long mission duration flight the intermittent IC engine can have a greater fuel efficiency as compared to a small gas turbine engine despite being heavier than the small gas turbine engine.

Operating altitude is another distinguishing factor between intermittent IC engines and small gas turbine engines. Intermittent IC engine may be difficult to implement in a high altitude, high speed aircraft such as a business jet. For example, a turbo-compounded or turbocharged rotary engine typically has relatively large volume coolers with relatively large frontal areas as compared to a small gas turbine engine. The relatively large volume coolers with relatively large frontal areas can produce considerable drag in a high speed aircraft application. In view thereof, intermittent IC engines historically have been used for powering low altitude aircraft such as propeller planes and helicopters.

Another factor to be considered is that fan thrust is typically controlled by varying fan speed. Thus, a propulsion system engine for a business jet should have a relatively large operating band to accommodate both low thrust operation and high thrust operation when, for example, at high speed, high altitude cruise. A typical intermittent IC engine, however, has a relatively narrow operating band as compared to a gas turbine engine.

What is needed is a propulsion system that provides an acceptable operating band that accommodates both low thrust operation and high thrust operation and one that provides improved fuel economy, and a cooling system that accommodates such a propulsion system.

SUMMARY

According to an aspect of the present disclosure, an aircraft propulsion system is provided that includes at least one hydraulic pump, at least one intermittent internal combustion (IC) engine, at least one hydraulic motor, at least one engine oil pump, and a cooling system. The at least one intermittent internal combustion (IC) engine is configured to drive the at least one hydraulic pump. The at least one hydraulic motor is in communication with the at least one hydraulic pump and configured to drive at least one propulsor fan. The cooling system includes fluid-air heat exchanger (AIR-EO HEX) configured to transfer thermal energy between a flow of an engine oil and a flow of ambient air, and a first fluid-to-fluid heat exchanger (EO-HF HEX) configured to transfer thermal energy between the flow of the engine oil and a flow of a hydraulic fluid. The at least one hydraulic pump is configured to power the at least one hydraulic motor with the hydraulic oil, and to provide sufficient motive force to the hydraulic oil to cause the hydraulic oil to pass through at least one hydraulic motor and at least one EO-HF HEX and back to the at least one hydraulic pump. The at least one engine oil pump is configured to provide sufficient motive force to the engine oil to pass the engine oil to and through the AIR-EO HEX, and thereafter to and through the EO-HF HEX, and thereafter to and through the intermittent IC engine.

In any of the aspects or embodiments described above and herein, the AIR-EO HEX is configured such that both the engine oil and the ambient air pass through the AIR-EO HEX, and the AIR-EO HEX is configured to transfer thermal energy from the engine oil to the ambient air.

In any of the aspects or embodiments described above and herein, the EO-HF HEX is configured such that both the engine oil and the hydraulic fluid pass through the EO-HF HEX, and the EO-HF HEX is configured to transfer thermal energy between the hydraulic fluid and the engine oil.

In any of the aspects or embodiments described above and herein, the system may further include a second fluid-to-fluid heat exchanger (EO-EC HEX) configured to transfer thermal energy between the flow of the engine oil and a flow of an engine coolant, and at least one engine coolant pump. The at least one engine coolant pump is configured to provide motive force to pass the engine coolant to and through the EO-EC HEX, and to and through the intermittent IC engine. The motive force provided to the engine oil produced by the at least one engine oil pump may be sufficient to pass the engine oil to and through the EO-EC HEX, and thereafter to pass the engine oil to and through the intermittent IC engine.

In any of the aspects or embodiments described above and herein, the AIR-EO HEX may be configured such that the thermal energy transferred between the flow of the engine oil and the flow of the ambient air is sufficient to permit the engine oil to perform as a coolant within the EO-HF HEX.

According to another aspect of the present disclosure, an aircraft propulsion system is provided that includes at least one hydraulic pump, at least one intermittent internal combustion (IC) engine, at least one hydraulic motor, at least one engine oil pump, and a cooling system. The at least one intermittent IC engine is configured to drive the at least one hydraulic pump. The at least one hydraulic motor is in communication with the at least one hydraulic pump and configured to drive at least one propulsor fan. The at least one engine oil pump is configured to pump an engine oil. The cooling system includes a fluid-air heat exchanger (AIR-EO HEX), a first fluid-to-fluid heat exchanger (EO-HF HEX), and a second fluid-to-fluid heat exchanger (EO-EC HEX). The fluid-air heat exchanger (AIR-EO HEX) is configured to transfer thermal energy between the engine oil and a flow of ambient air. The EO-HF HEX is configured to transfer thermal energy between the engine oil and a flow of a hydraulic fluid. The EO-EC HEX is configured to transfer thermal energy between the engine oil and a flow of an engine coolant. The at least one hydraulic pump is configured to provide the hydraulic oil to the at least one hydraulic motor sufficient to drive the at least one hydraulic motor, and to provide sufficient motive force to the hydraulic oil to cause the hydraulic oil to pass through at least one hydraulic motor and at least one EO-HF HEX and back to the at least one hydraulic pump. The cooling system is configured such that a flow of the engine oil passes through the AIR-EO HEX, and a first portion of the engine oil flow selectively passes through the intermittent IC engine. The first portion of the engine oil flow is less than the engine oil flow.

In any of the aspects or embodiments described above and herein, the at least one engine oil pump may include a first engine oil pump configured to pump the first portion of the engine oil flow through the intermittent IC engine.

In any of the aspects or embodiments described above and herein, the system may include a first valve configured to divert the first portion of the engine oil flow through the intermittent IC engine.

In any of the aspects or embodiments described above and herein, the first valve may be selectively controllable to regulate a volumetric flow rate of the first portion of the engine oil flow through the intermittent IC engine.

In any of the aspects or embodiments described above and herein, the at least one engine oil pump may include a second engine oil pump configured to pump the engine oil flow exiting the EO-EC HEX.

In any of the aspects or embodiments described above and herein, the system may include a second valve configured to selectively control the engine oil flow through the EO-HF HEX.

In any of the aspects or embodiments described above and herein, the second valve may be selectively controllable to divert a second portion of the engine oil flow to bypass the EO-HF HEX.

In any of the aspects or embodiments described above and herein, the system may include a thermostatic fluid control valve disposed to control engine oil flow through the EO-HF HEX.

According to an aspect of the present disclosure, a method of cooling components within an aircraft propulsion system is provided. The aircraft propulsion system has a hydraulic pump, an intermittent internal combustion (IC) engine configured to drive the hydraulic pump, a hydraulic motor in communication with the hydraulic pump and configured to drive at least one propulsor fan, and at least one engine oil pump. The method includes the steps of using the at least one engine oil pump to pump a flow of engine oil through a fluid-air heat exchanger (AIR-EO HEX) and a fluid-to-fluid heat exchanger (EO-HF HEX), wherein the AIR-EO HEX is configured to transfer thermal energy from the flow of engine oil to a flow of ambient air in communication with the AIR-EO HEX, and wherein the EO-HF HEX is configured to transfer thermal energy from a flow of a hydraulic fluid to the flow of engine oil; and using the hydraulic pump to power the hydraulic motor using the flow of hydraulic oil, and to pump the hydraulic oil through the EO-HF HEX and back to the hydraulic pump.

In any of the aspects or embodiments described above and herein, the system may include a second fluid-to-fluid heat exchanger (EO-EC HEX) configured to transfer thermal energy between the flow of the engine oil and a flow of an engine coolant, and at least one engine coolant pump. The method may include using the at least one engine coolant pump to pump engine coolant to and through the EO-EC HEX, and to and through the intermittent IC engine. The motive force provided to the engine oil produced by the at least one engine oil pump may be sufficient to pass the engine oil to and through the EO-EC HEX, and thereafter to pass the engine oil to and through the intermittent IC engine.

In any of the aspects or embodiments described above and herein, the AIR-EO HEX may be configured such that the thermal energy transferred between the flow of the engine oil and the flow of the ambient air is sufficient to permit the engine oil to perform as a coolant within the EO-HF HEX and the EO-EC HEX.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Aspects of the present disclosure include an aircraft propulsion system 20 and method for operating the same that include components such as an intermittent IC engine 22, at least one propulsor fan 24, at least one hydraulic pump 26, a hydraulic motor 28, a turbine section 30, a compressor section 32, and a cooling system 34. In some embodiments the present disclosure system 20 may include a system controller 36 in communication with other components within the system 20. As will be described below, the present disclosure aircraft propulsion system 20 contemplates several different configurations that may include one or more than one of the aforesaid components.

The intermittent IC engine 22 (e.g., an internal combustion engine characterized by periodic ignition of fuel and air) may be a Wankel type rotary engine, or a reciprocating piston engine, and other constant volume internal combustion engines. The present disclosure is not limited to any particular type of intermittent IC engine 22. The intermittent IC engine 22 may be configured to combust a variety of different fuels (e.g., hydrocarbon based fuel, hydrogen, or the like) and is not limited to any particular type of fuel. During operation, the intermittent IC engine 22 intakes air and fuel and combusts the mixture of air and fuel to produce power (e.g., via an output shaft). The combustion of the air/fuel mixture produces exhaust gases. As will be described below, the exhaust gases produced by the intermittent IC engine 22 may be passed to the turbine section 30 or may bypass the turbine section 30 and be routed to an exhaust gas device 38 (e.g., a muffler, a nozzle, etc.) that may be configured to produce some amount of propulsive force (e.g., thrust). In some embodiments, the intermittent IC engine 22 and other components may be mounted within the fuselage 40 of the aircraft 42 and the propulsor fan 24 and other components may be mounted in a nacelle type structure ("nacelle 44"). The present disclosure is not limited to any particular mounting configuration within the aircraft 42. The intermittent IC engine 22 utilizes a lubrication oil ("engine oil") that functions to lubricate moving parts within the intermittent IC engine 22 and to remove thermal energy produced within the intermittent IC engine 22 during operation. An engine oil pump provides motive force to circulate the engine oil through the intermittent IC engine 22 during operation. The intermittent IC engine 22 further includes an IC engine cooling system that circulates an engine coolant fluid through components (e.g., block, cylinder heads, etc.) of the intermittent IC engine 22 during operation. The IC engine cooling system includes an engine coolant pump that provides motive force to circulate the engine coolant fluid through the intermittent IC engine 22 during operation.

The turbine section 30 may be a radial-type turbine with a scroll or an axial-type turbine (e.g., having a rotor with a hub and a plurality of turbine blades extending radially outwardly from the hub). In some embodiments, a turbine section 30 may be configured to accept exhaust gases along a first axis (e.g., a Y-axis) and to exit the exhaust gases along a second axis (e.g., an X-axis) that is substantially orthogonal to the first axis. The turbine section 30 may be a single stage turbine or may have a plurality of turbine stages.

The compressor section 32 may be a radial-type compressor with a scroll or an axial-type compressor (e.g., a rotor having a hub with a plurality of compressor blades extending radially out from the hub). In some embodiments, a compressor section 32 may be configured to accept intake air along a first axis (e.g., a Y-axis) and to exhaust compressed air along a second axis (e.g., an X-axis) that is substantially orthogonal to the first axis. More specifically, the compressor section 32 is configured to receive ambient air at a first pressure ($P_{ambient}$) and to selectively compress that air to a second pressure ($P_{compressed}$) higher than that of the first pressure; i.e., $P_{ambient} < P_{compressed}$. The compressor section 32 may be a single stage compressor or may have a plurality of compressor stages.

The at least one propulsor fan 24 (e.g., a fan, propeller, or the like) utilized in the present system 20 includes a hub 46 and a plurality of fan blades 48 extending radially out from the hub 46. The propulsor fan 24 is configured for rotation about a rotational axis. The hub 46 may be configured to be driven directly by the hydraulic motor 28 or indirectly through an input shaft (or other mechanical structure) in communication with the hub 46. The fan blades 48 are spaced apart from one another around the circumference of the hub 46. The fan blades 48 may be mechanically attached to the hub 46, or the hub 46 and fan blades 48 may be a unitary structure. Rotation of the propulsor fan 24 about the rotational axis in a predetermined direction (e.g., either clockwise or counterclockwise) and within a predetermined rotational velocity range produces thrust that can be used to translationally power the aircraft 42. The propulsor fan 24 configuration (e.g., number, size, geometry, etc. of the fan blades as well as the number of fans and their intended direction of rotation) may be varied to satisfy the thrust requirements of the aircraft 42 application; e.g., different amounts of thrust for different portions of an aircraft flight program. The present disclosure is not limited to any particular propulsor fan 24 configuration and may also be applied to open propellers.

The hydraulic pump 26 is in fluid communication with the hydraulic motor 28. The hydraulic pump 26 is configured to receive hydraulic fluid from a fluid reservoir at a first pressure ("input pressure") and to increase the fluid pressure of that hydraulic fluid to a second elevated pressure ("output pressure"), higher than the first pressure; i.e., output pressure>>input pressure. The hydraulic pump 26 may be controllable, to vary the volumetric fluid flow rate therethrough or to vary the pressure difference between the high pressure side and low pressure side of the pump. When combined with a variable and/or controllable hydraulic motor, such as a variable displacement axial piston motor, the hydraulic pump can be a fixed displacement pump. The present disclosure is not limited to any particular type of hydraulic pump 26. Nonlimiting examples of an acceptable type of hydraulic pump 26 include an axial-type pump, radial-type pump, inline axial piston pump, bent axis pump, screw pump, rotary vane pump, gear pump, or the like. Some present disclosure embodiments may utilize more than one hydraulic pump 26 to produce hydraulic fluid at a desired elevated pressures and volumetric flow rates; e.g., a plurality of hydraulic pumps 26 configured in series or parallel for redundancy. The hydraulic pump(s) 26 is driven by the intermittent IC engine 22. Selective control of the hydraulic pump(s) 26 may be accomplished using stored instructions executable by the system controller 36.

The hydraulic motor 28 is in fluid communication with the hydraulic pump 26 and is directly or indirectly coupled with the propulsor fan 24. For example, the hydraulic motor 28 may include an output shaft coupled to a fan input shaft, or may be coupled to the propulsor fan 24 via a gear arrangement, or other mechanical coupling. The present disclosure is not limited to any particular arrangement for coupling the hydraulic motor 28 to the propulsor fan 24. The hydraulic motor 28 is configured to convert hydraulic fluid pressure difference (from the hydraulic pump 26) into torque and angular displacement (e.g., rotation) of an output shaft. A variety of different hydraulic motor types are known. The present disclosure is not limited to any particular hydraulic motor type. In some systems the hydraulic motor(s) can be a fixed displacement pump or it can be a variable displacement pump. It can be a fixed displacement design, or a variable displacement design that is not controlled (e.g. spring controlled reacting to fluid pressures) or it can be selectively controlled. Selective control of the hydraulic motor 28 may be accomplished using stored instructions executable by the system controller 36.

The hydraulic pump 26 may be in fluid communication with the hydraulic motor 28 via fluid flow control hardware (e.g., valving, etc.—not shown) that is configurable to selectively control the pressure and/or volumetric flow rate of the hydraulic fluid between the hydraulic pump 26 and the hydraulic motor 28. As will be detailed below, the operation of the propulsor fan 24 may be controlled during different portions of an aircraft flight program to produce different amounts of propulsive force. More specifically, operation of the propulsor fan 24 may be controlled during different portions of an aircraft flight program by selectively controlling the pressure and/or volumetric flow rate to the hydraulic motor 28. The selective control of the hydraulic motor 28 may be accomplished by controlling the hydraulic pump 26, or by controlling the fluid flow hardware (e.g., valves, etc.), or some combination thereof. Selective control of the fluid flow control hardware may be accomplished using stored instructions executable by the system controller 36.

Some embodiments of the present disclosure include a gearbox, a variable speed drive ("VSD"), or the like in communication with the turbine section 30, the compressor section 32, and the intermittent IC engine 22. To facilitate the description herein, the gearbox, VSD, or the like will be referred to generically as a "gearbox 50". The gearbox 50 is configured to be driven by the intermittent IC engine 22 and the turbine section 30, and to drive the compressor section 32. The gearbox 50 is also configured to accommodate rotational velocity (i.e. angular rate of rotation or revolution per minute—"rpm") differences between the turbine section 30, the compressor section 32, and/or the intermittent IC engine 22. Operational rotational speeds of the turbine section 30 typically differ from those of the intermittent IC engine 22 and compressor section 32. The gearbox 50 permits the turbine section 30, compressor section 32, and/or the intermittent IC engine 22 to operate at different rotational speeds; e.g., operate at rotational speeds desirable for the respective component. The gearbox 50 may also be configured to permit the turbine section 30 to be decoupled from the compressor section 32 and/or the intermittent IC engine 22; e.g., in case of a component performance issue. Selective control of the gearbox 50 may be performed using stored instructions executable by the system controller 36. As will be explained herein, in some operational applications (e.g., portions of an aircraft flight program) the turbine section 30 may produce power in excess of that required to drive the compressor section 32. In those applications, power from the turbine section 30 may be applied to the intermittent IC engine 22 to increase the output of the intermittent IC engine 22, or to assist the intermittent IC engine 22, or any combination thereof.

Embodiments of the present disclosure aircraft propulsion system 20 may include a system controller 36 in communication with the with other components within the system 20, including the intermittent IC engine 22, the hydraulic pump 26, the hydraulic motor 28, the gearbox 50, and the like to control and or receive signals therefrom to perform the functions described herein. The system controller 36 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 20 to accomplish the same algorithmically and/or coordination of system 20 components. The system controller 36 may include a single memory device or a plurality of memory devices and the present disclosure is not limited to any particular type of memory device.

Figure 1:
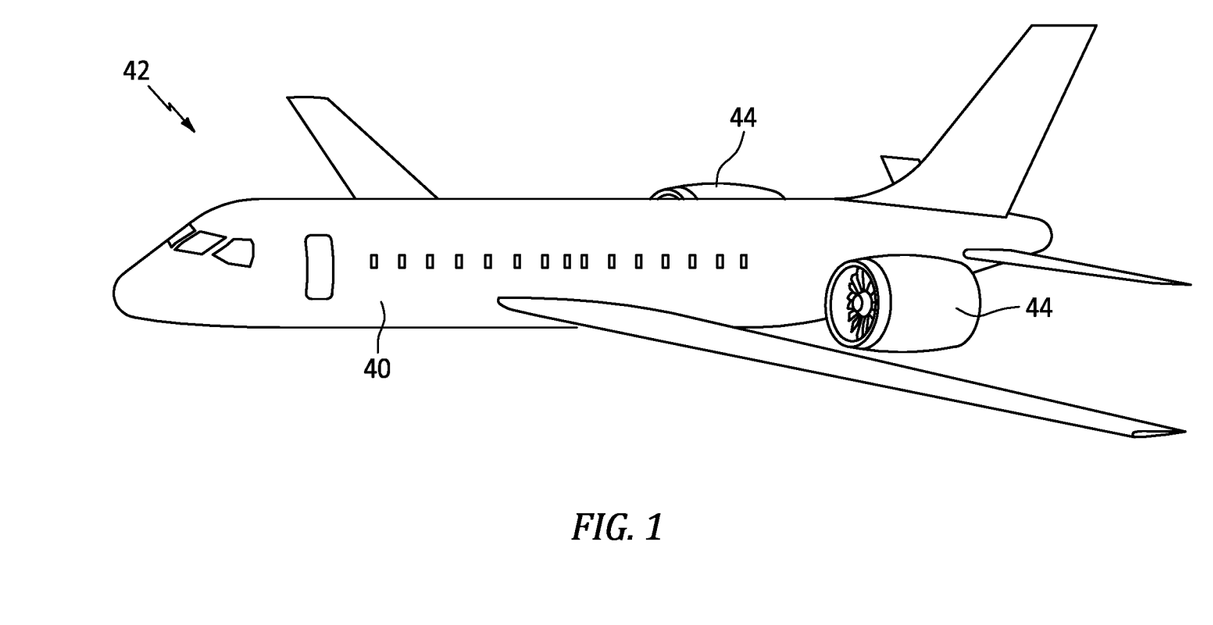
FIG. 1 is a diagrammatic illustration of an aircraft.
Figure 2:
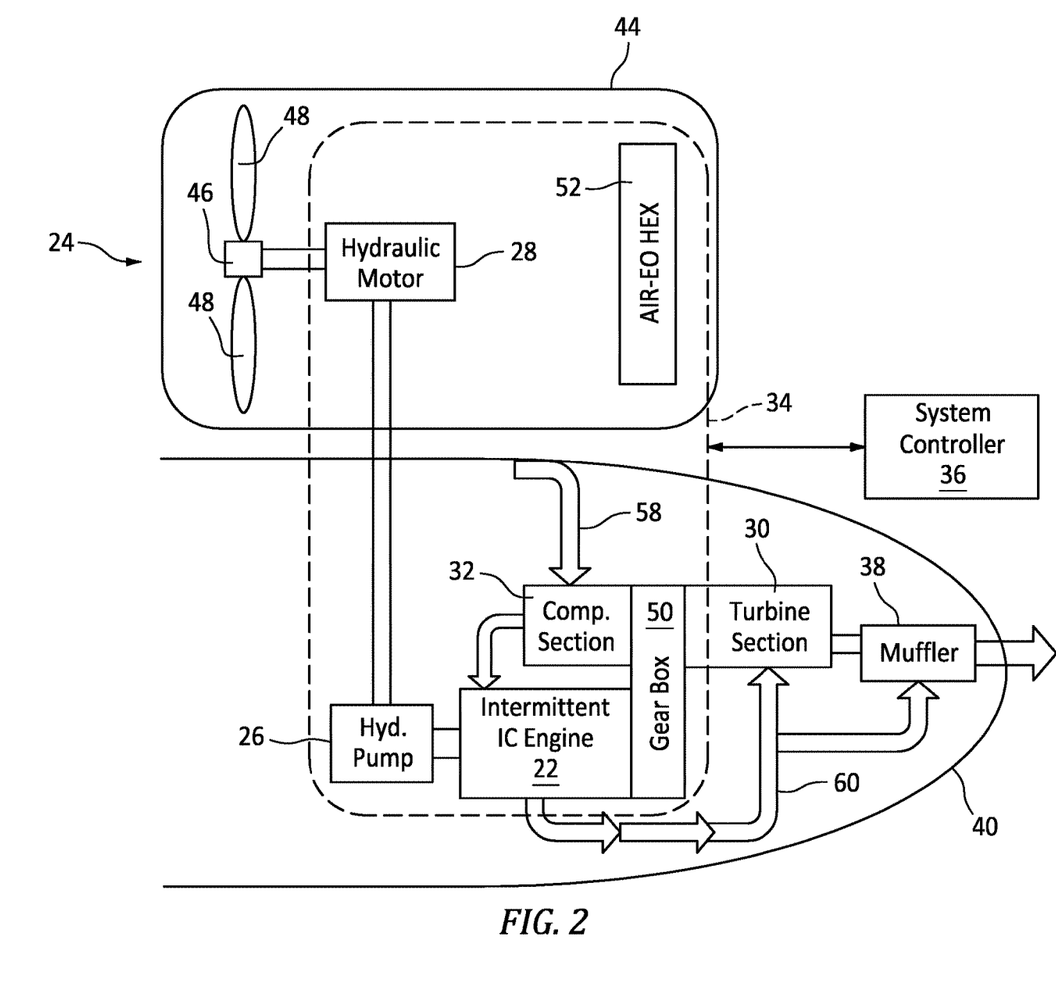
FIG. 2 is a schematic illustration of a present disclosure aircraft propulsion system.

The cooling system 34 includes an ambient air/engine oil heat exchanger ("AIR-EO HEX 52") and an engine oil/hydraulic fluid heat exchanger ("EO-HF HEX 54"). In some embodiments, the cooling system further includes an engine oil/engine coolant heat exchanger ("EO-EC HEX 56"). Other than the AIR-EO HEX 52, the cooling system 34 components are not shown in FIG. 2 to avoid complicating the schematic representation of the aircraft propulsion system 20. The cooling system 34 components are shown schematically in FIGS. 3 and 4-4B.

Figure 3:
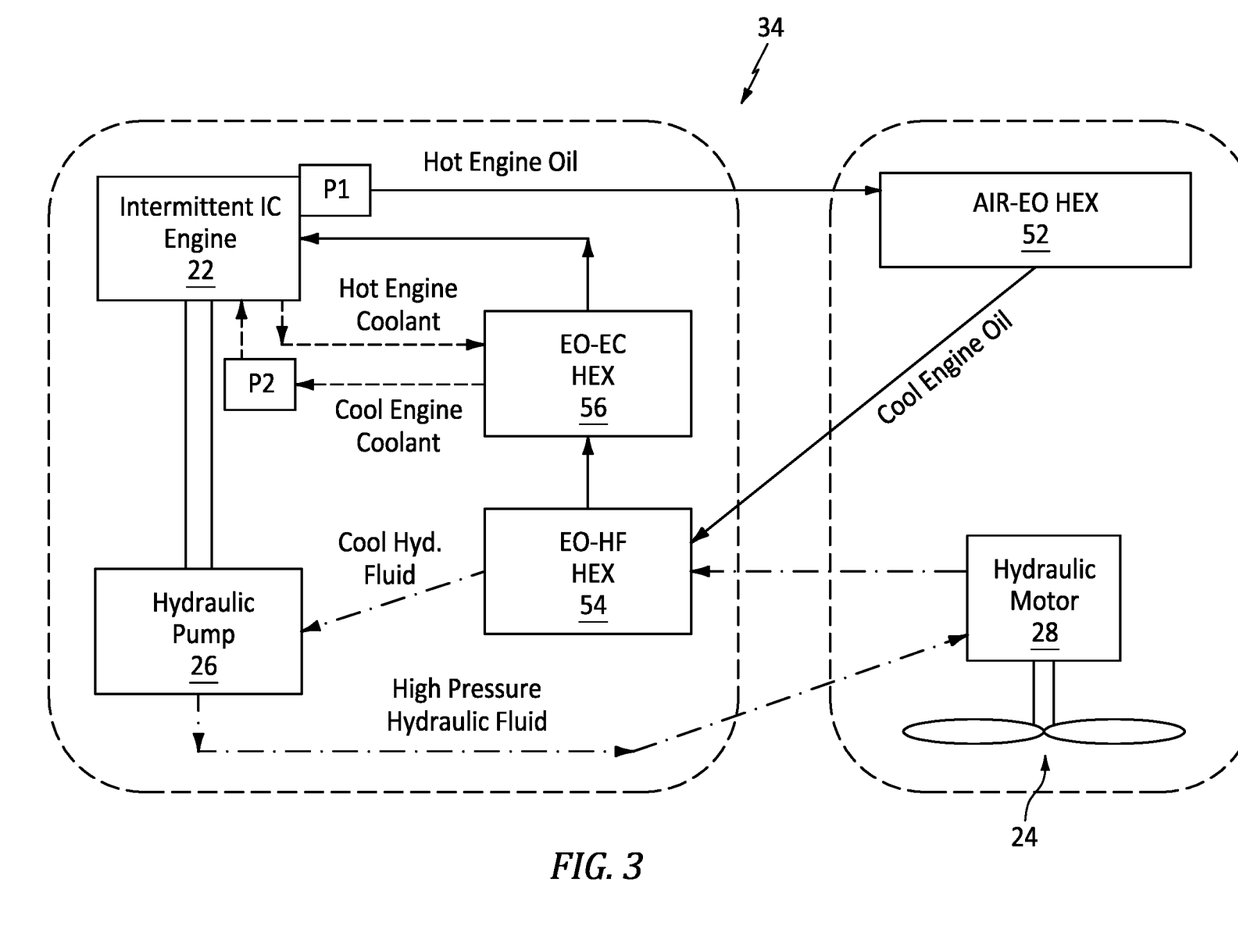
FIG. 3 is a schematic illustration of a cooling system embodiment.

The AIR-EO HEX 52 is a fluid-to-air type heat exchanger, or "Cooler" that permits transfer of thermal energy from the engine oil to the ambient air. As will be described herein, the AIR-EO HEX 52 is sized to remove a sufficient amount of thermal energy from the engine oil to permit the engine oil to act as a coolant within the EO-HF HEX 54 (and the EO-EC HEX 56 when included), and to satisfy its requirements as a coolant within the intermittent IC engine 22. The AIR-EO HEX 52 may be mounted in a variety of different locations within the aircraft 42 that permit access to ambient air. In some embodiments the AIR-EO HEX 52 may be equipped with a dedicated fan to help to push air through the matrix of the cooler. FIG. 3 schematically illustrates a cooling system embodiment wherein the AIR-EO HEX 52 disposed within a nacelle 44 structure of the aircraft 42. Alternatively, the AIR-EO HEX 52 may be disposed within a duct disposed in the fuselage 40 or in the structure between nacelle 44 and fuselage 40. The present disclosure is not limited to any particular AIR-EO HEX 52 location. The EO-HF HEX 54 is a fluid-to-fluid type heat exchanger that permits transfer of thermal energy between the hydraulic fluid and the engine oil. As will be described herein, the EO-HF HEX 54 is sized to cool (i.e., remove thermal energy from) the hydraulic oil to within a range that permits the hydraulic oil to be worked (e.g., increased in pressure) within the hydraulic pump 26 and permits the hydraulic oil to provide motive force to the hydraulic motor 28. The EO-EC HEX 56 is a fluid-to-fluid type heat exchanger that permits transfer of thermal energy from the engine coolant fluid to the engine oil. As will be described herein, the EO-EC HEX 56 is sized to cool the engine coolant fluid to within a range that permits the engine coolant fluid to satisfy its requirements as a coolant within the intermittent IC engine 22. The present disclosure is not limited to any particular type of engine coolant fluid; e.g., the engine coolant fluid may be glycol, or a glycol/water mixture, or other known coolant.

In the operation of this embodiment of the present disclosure system 20, the intermittent IC engine 22 may be started at the beginning of an aircraft flight program (e.g., a flight of the aircraft 42 from point A to point B at selected altitudes and velocities) using a conventional starter powered by a battery. When the intermittent IC engine 22 is operating, air is drawn into the intake of the intermittent IC engine 22, mixed with fuel, combusted, and exhaust gases are produced. The produced exhaust gases may be directed to the turbine section 30 or may be bypassed around the turbine section 30 for portions of the aircraft flight program.

In some or all portions of an aircraft flight program, inlet ambient air at an ambient pressure ($P_{ambient}$) may be collected and passed to the compressor section 32; e.g., via compressor air ducting 58. The inlet ambient air received by the compressor section 32 is selectively compressed to a higher pressure ($P_{ambient} < P_{compressed}$) and may be provided to the intake of the intermittent IC engine 22. As will be detailed below, the work/energy necessary to power the compressor section 32 and thereby compress the ambient air is provided by the turbine section 30. The benefit of utilizing the compressor section 32 to compress air for intake by the intermittent IC engine may vary during portions of an aircraft flight program. For example, compressed air is likely more beneficial at higher altitudes where air density is less than at sea level, and conversely compressed air is likely less beneficial (or perhaps unnecessary) at low altitudes approaching sea level. The present disclosure may address this aspect in a variety of different manners. For example, in instances wherein the system 20 does not require compressed air, the compressor air ducting 58 may be configured to permit selective bypass of a portion or all of ambient inlet air around the compressor section 32 and direct the bypassed ambient air (as well as the compressed air if the bypass is partial) to the intake of the intermittent IC engine 22. As another example, to selectively vary the level of work performed by the compressor section 32, the compressor section may include variable geometry features such as moveable vanes to adjust the pressure ratio of the compressor. In this manner, the present disclosure permits selective conservation of work available from the turbine section 30, thereby permitting that turbine work to be utilized elsewhere as will be described herein.

Exhaust gases produced by the intermittent IC engine 22 are selectively directed to the turbine section 30 via exhaust gas ducting 60 to drive the turbine section 30. The exhaust gases power the turbine section 30. As stated above, the turbine section 30 may be selectively operated to drive the compressor section 32 during portions of an aircraft flight program wherein it is advantageous to provide compressed air to the intermittent IC engine 22, or the turbine section 30 may be selectively operated to provide motive force to the intermittent IC engine 22 to increase the output of the intermittent IC engine 22, or to assist the intermittent IC engine 22, or any combination thereof. As stated above, the present disclosure permits conservation of work performed by the turbine section 30. If during a portion of the aircraft flight program compressed air from the compressor section 32 is not required, then all of the work produced by the turbine section 30 may be utilized to provide motive force to the intermittent IC engine 22. In similar fashion, if during a portion of the aircraft flight program the amount of work required to power the compressor section 32 is less than the total amount of work available from the turbine section 30, then a portion of the work produced by the turbine section 30 may be utilized to provide motive force to the intermittent IC engine 22. Hence, aspects of the present disclosure contemplate operating the compressor section 32 (e.g., by limiting the amount of input ambient air, or by varying the pressure ratio across the compressor section 32, etc.) in a way that reflects the usefulness of compressed air to the intermittent IC engine 22. In this manner, the energy efficiency of the present disclosure system 20 may be increased. Exhaust gases passing through the turbine section 30 are passed to the exhaust gas device 38 (e.g., a muffler, a nozzle, etc.) that may be configured to produce some amount of propulsive force (e.g., thrust). In some embodiments, the exhaust gas ducting 60 may be configured to selectively permit exhaust gases to bypass the turbine section 30 and pass directly to the exhaust gas device 38.

As stated above, the gearbox 50 is configured to accommodate rotational velocity differences between the turbine section 30, the compressor section 32, and/or the intermittent IC engine 22. Operational rotational speeds of the turbine section 30 typically differ from those of the intermittent IC engine 22 and compressor. The gearbox 50 permits the turbine section 30, compressor section 32, and/or the intermittent IC engine 22 to operate at different rotational speeds; e.g., operate at rotational speeds desirable for the respective component.

The intermittent IC engine 22 selectively drives the hydraulic pump 26 to provide pressurized hydraulic fluid at a volumetric flow rate to the hydraulic motor 28. The pressure and volumetric flow rate of the hydraulic fluid from the hydraulic pump 26 to the hydraulic motor 28 may be selectively controlled (e.g., via stored instructions, input from an operator, etc.), or the pressure and volumetric flow rate of the hydraulic fluid from the hydraulic pump 26 to the hydraulic motor 28 may be controlled using fluid flow hardware (e.g., valves, variable restrictors, etc.), or some combination thereof. The hydraulic motor 28 and propulsor fan 24 are rotationally driven by the input pressurized hydraulic fluid from the hydraulic motor 28.

Rotation of the propulsor fan 24 results in ambient air being drawn through the nacelle 44 and that airflow produces the propulsive force (e.g., thrust) necessary to power the aircraft 42. The amount of propulsive force produced by the propulsor fan 24 can be selectively controlled to satisfy the requirements of the various portions of the aircraft flight program; e.g., propulsive force required for takeoff, propulsive force required for low altitude flight at lower aircraft velocities, propulsive force required for high altitude flight at high aircraft velocities (e.g., cruise), propulsive force required for landing, and the like.

Embodiments of the present disclosure system 20 are configured to permit the propulsor fan 24 to rotate at different rotational velocities to produce varying amounts of thrust (e.g., a relatively large operating band that permits low thrust operations and high thrust operations, for example, at high speed, high altitude cruise) in a manner decoupled from the rotational velocity of the intermittent IC engine 22. As stated above, intermittent IC engines typically have a relatively narrow operating band as compared to a gas turbine engine. Hence, embodiments of the present disclosure system 20 permit the propulsor fan 24 to operate at a wide band of operating rotational velocities advantageous for producing propulsive power, and permit the turbine section 30, intermittent IC engine 22, and compressor section 32 to operate at advantageous respective rotational velocities.

The present disclosure cooling system 34 provides improvements over known aircraft propulsion system cooling systems. In the present disclosure system 20, hydraulic oil is used to provide motive force and it is cooled by cooled engine oil, by means of a fluid-to-fluid heat exchanger. Hydraulic oil is pumped to selectively controlled higher pressures (as described above) to power the hydraulic motor 28. As the hydraulic pump 26 increases the pressure of the hydraulic oil, the temperature of the hydraulic oil also typically increases. As the higher pressure oil powers the hydraulic motor 28, the work performed by the hydraulic oil within the motor 28 may also cause an increase in the temperature of the hydraulic oil. The engine oil/hydraulic fluid heat exchanger (EO-HF 54) is configured to transfer thermal energy from the hydraulic fluid to the engine oil and thereby cool the hydraulic fluid to a temperature acceptable for use by the hydraulic pump 26 (and subsequently by the hydraulic motor 28) as the hydraulic oil repeats the cycle. The engine oil/hydraulic fluid heat exchanger (EO-HF 54) could alternatively be installed between the motor and the fluid reservoir used by the pump, or it could be installed between the pump and the motor. As will be described below, the ambient air/engine oil heat exchanger (AIR-EO HEX 52) cools the engine oil to a temperature that enables the requisite transfer of thermal energy from the hydraulic fluid to the engine oil. In some embodiments, the EO-HF 54 may also be configured to transfer thermal energy from the fluids to ambient air; e.g., via cooling fins, and the like.

As stated above, the engine oil functions to lubricate moving parts within the intermittent IC engine 22 and to remove thermal energy produced within the intermittent IC engine 22 during operation of the intermittent IC engine 22. In the embodiment of the present system 20 shown in FIG. 3, engine oil is transferred from the intermittent IC engine 22 to the AIR-EO HEX 52 where thermal energy within the engine oil is transferred to the ambient air. The engine oil is subsequently transferred from the AIR-EO HEX 52 to the EO-HF HEX 54 as described above, where the engine oil operates to cool (i.e., remove thermal energy from) the hydraulic fluid. In those embodiments that include an engine coolant/engine oil heat exchanger (EO-EC HEX 56), the engine oil is then transferred from the EO-HF HEX 54 to the EO-EC HEX 56, where the engine oil operates to cool (i.e., remove thermal energy from) the engine coolant fluid. The engine oil is then transferred from the EO-EC HEX 56 back to the intermittent IC engine 22, where the cycle repeats itself. At least one pump ("P1") is included to provide motive force to the engine oil through the above described circuit. The engine oil pump may be selectively controlled to vary the volumetric flow rate/velocity and/or the pressure of the engine oil through the engine oil circuit. FIG. 3 schematically depicts the pump P1 as being disposed downstream of the intermittent IC engine 22 (i.e., engine oil travels from the intermittent IC engine 22 to the pump P1), but the present disclosure system 20 is not limited to this or any engine oil pump location.

Figure 4:
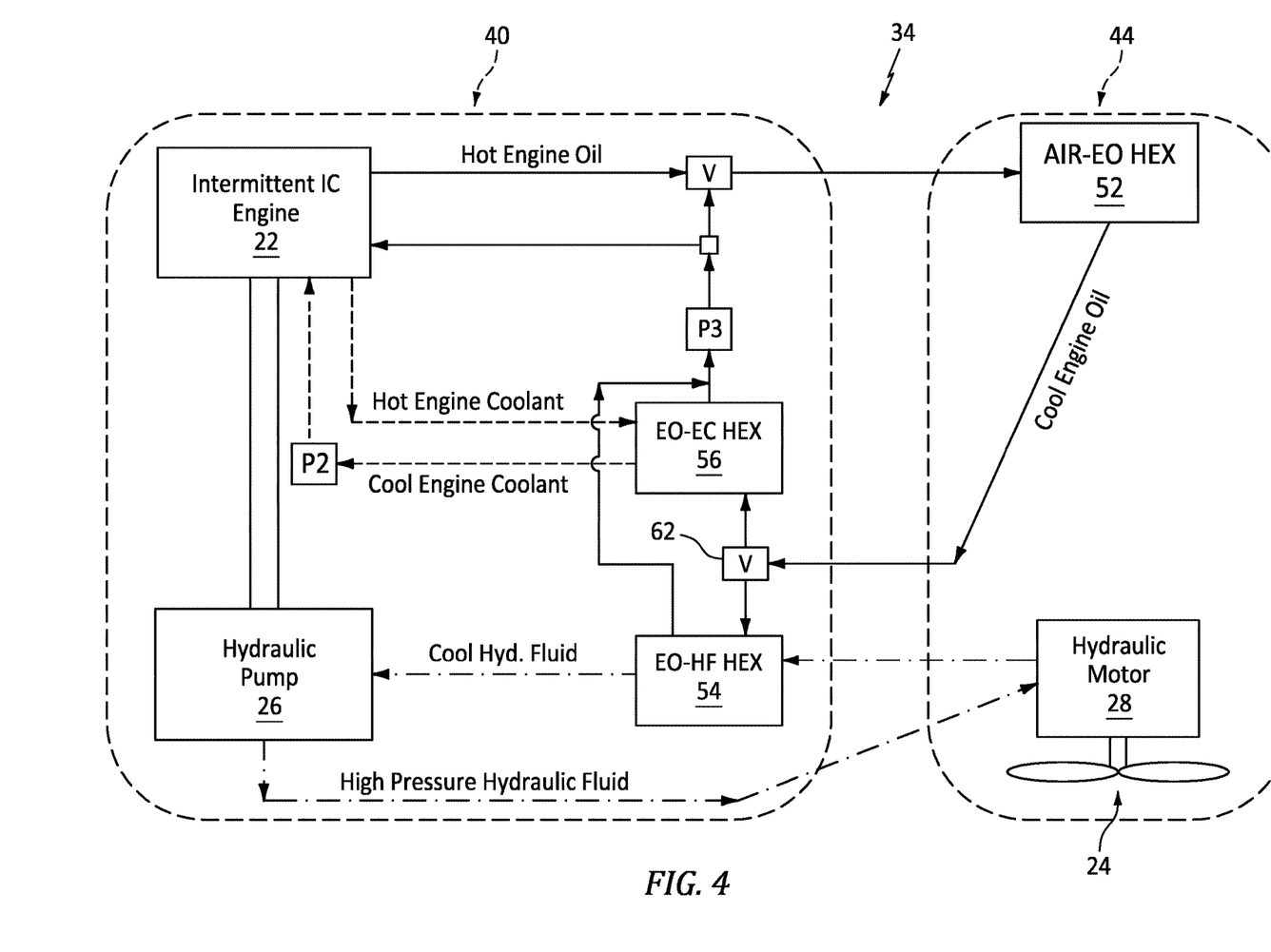
FIG. 4 is a schematic illustration of a cooling system embodiment.

In some embodiments, the system 20 may include more than one pump in the engine oil circuit and may include valving for controlling the volumetric flow rate/velocity and/or the pressure of the engine oil within the engine oil circuit. In some embodiments, the engine oil flow may be divided into parallel paths such that only a portion of the total oil flow passes through EO-HF HEX 54 or the EO-EC HEX or the IC engine, including any combination thereof. FIGS. 4-4D illustrate nonlimiting embodiment examples.

In FIG. 4, engine oil passes from the intermittent IC engine 22 to a valve and then to the AIR-EO HEX 52. Engine oil exiting the AIR-EO HEX 52 may pass to a controllable valve 62 that controls the relative flows of engine oil to the EO-HF HEX 54 and the EO-EC HEX 56. In a first mode of operation, the valve 62 may be operated to pass a first portion of the engine oil flow from the AIR-EO HEX 52 to the EO-HF HEX 54 and the remaining portion of the engine oil to the EO-EC HEX 56. In a second mode of operation, the valve 62 may be operated to pass all the engine oil flow from the AIR-EO HEX 52 to the EO-EC HEX 56. FIG. 4 also shows the engine oil exiting the EO-HF HEX 54 bypassing the EO-EC HEX 56 and recombining with the engine oil flow exiting the EO-EC HEX 56.

Figure 4A:
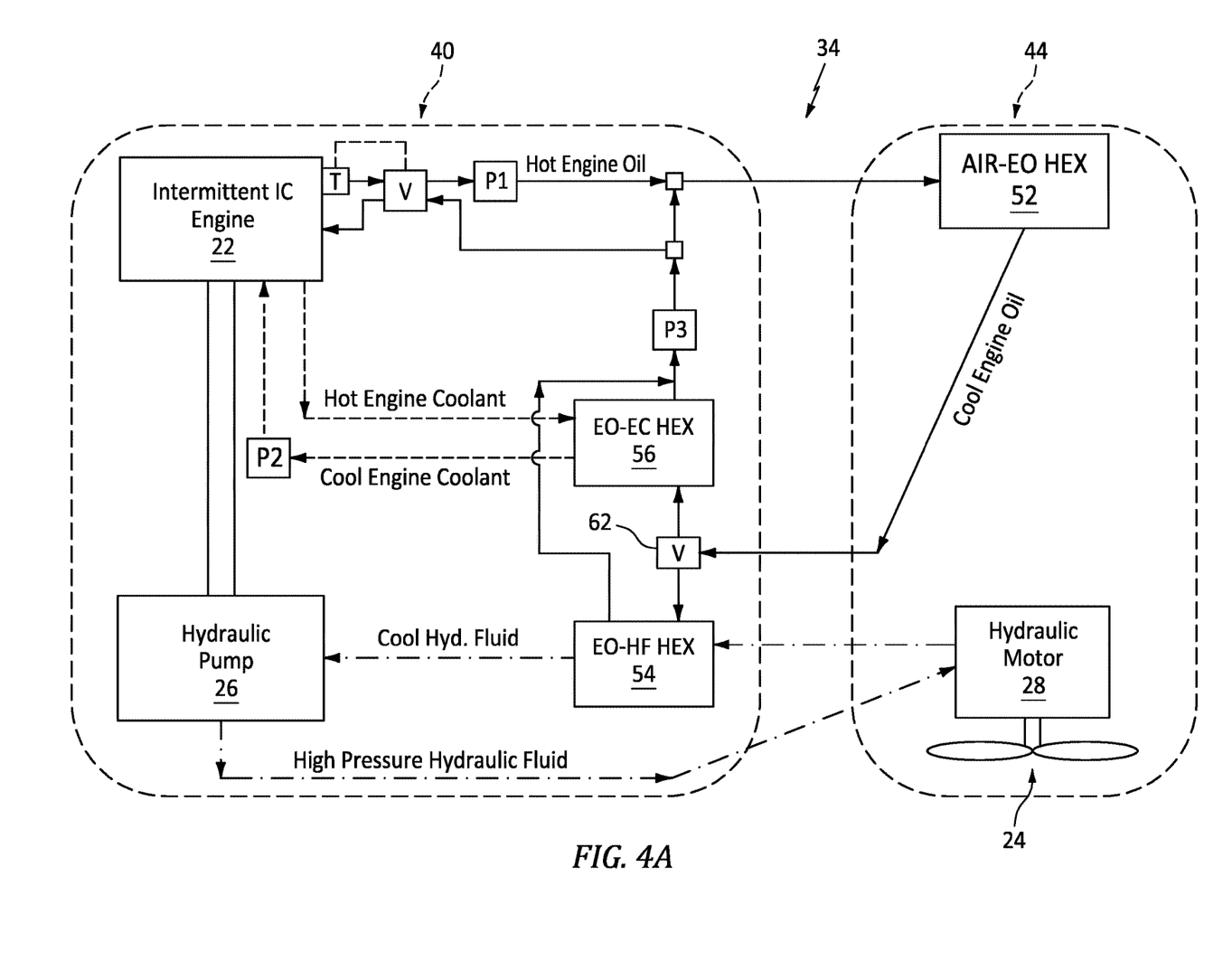
FIG. 4A is a schematic illustration of a cooling system embodiment.
Figure 4B:
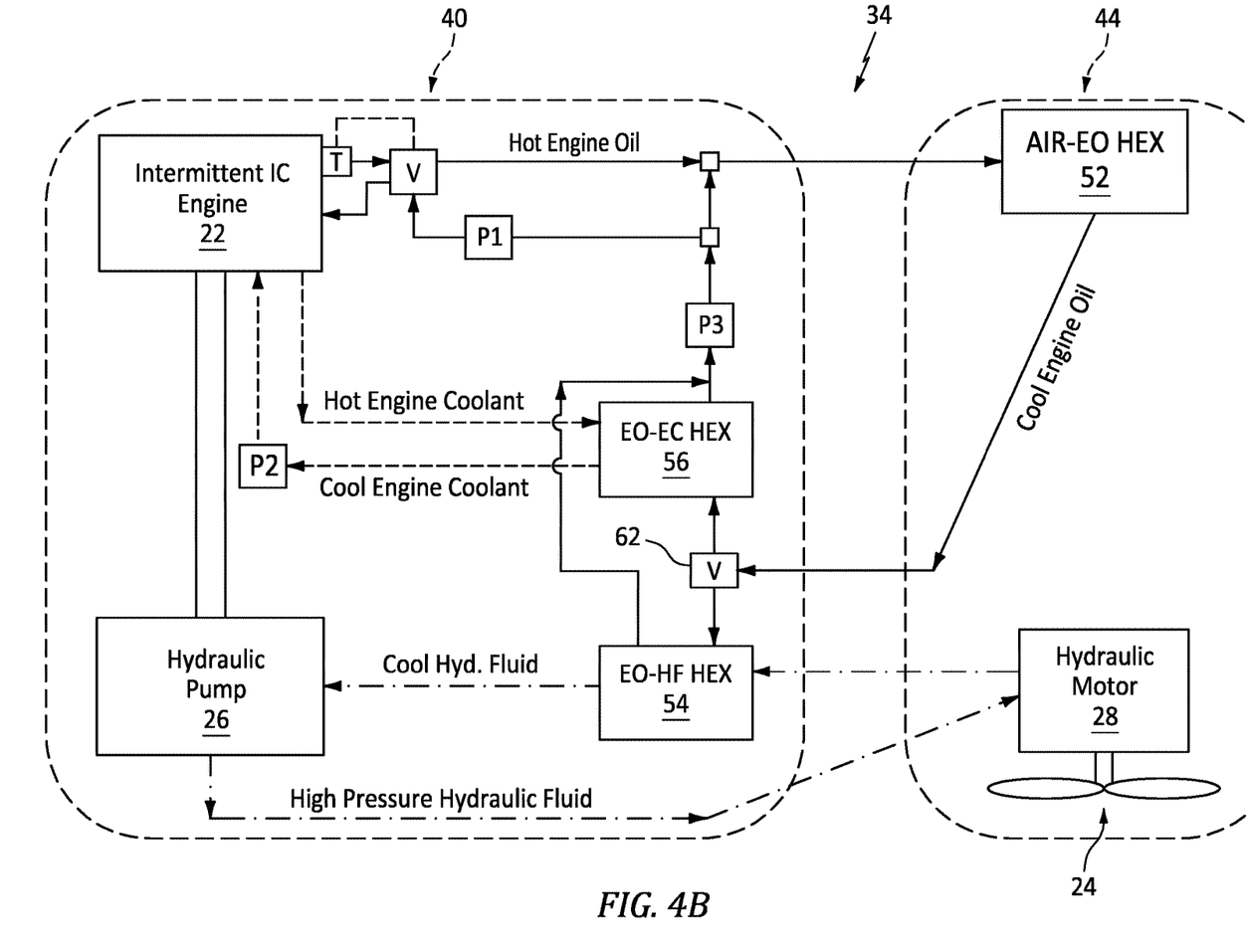
FIG. 4B is a schematic illustration of a cooling system embodiment.

In FIG. 4A, the structure is substantially the same as that shown in FIG. 4 with the exception that engine oil is sensed by a temperature sensor and oil is subsequently passed to a controllable valve in communication with the temperature sensor. If the engine oil is below a preset temperature, the valve may direct the engine oil back into the intermittent IC engine 22. If the engine oil is above the preset temperature, then engine oil may be directed to a pump P1 and then subsequently to the AIR-EO HEX 52. The system embodiment shown in FIG. 4B is also similar to the embodiments shown in FIGS. 4 and 4A, with the exception that pump P1 is now disposed in the engine oil return line that returns engine oil to the valve disposed at the intermittent IC engine 22.

Figure 4C:
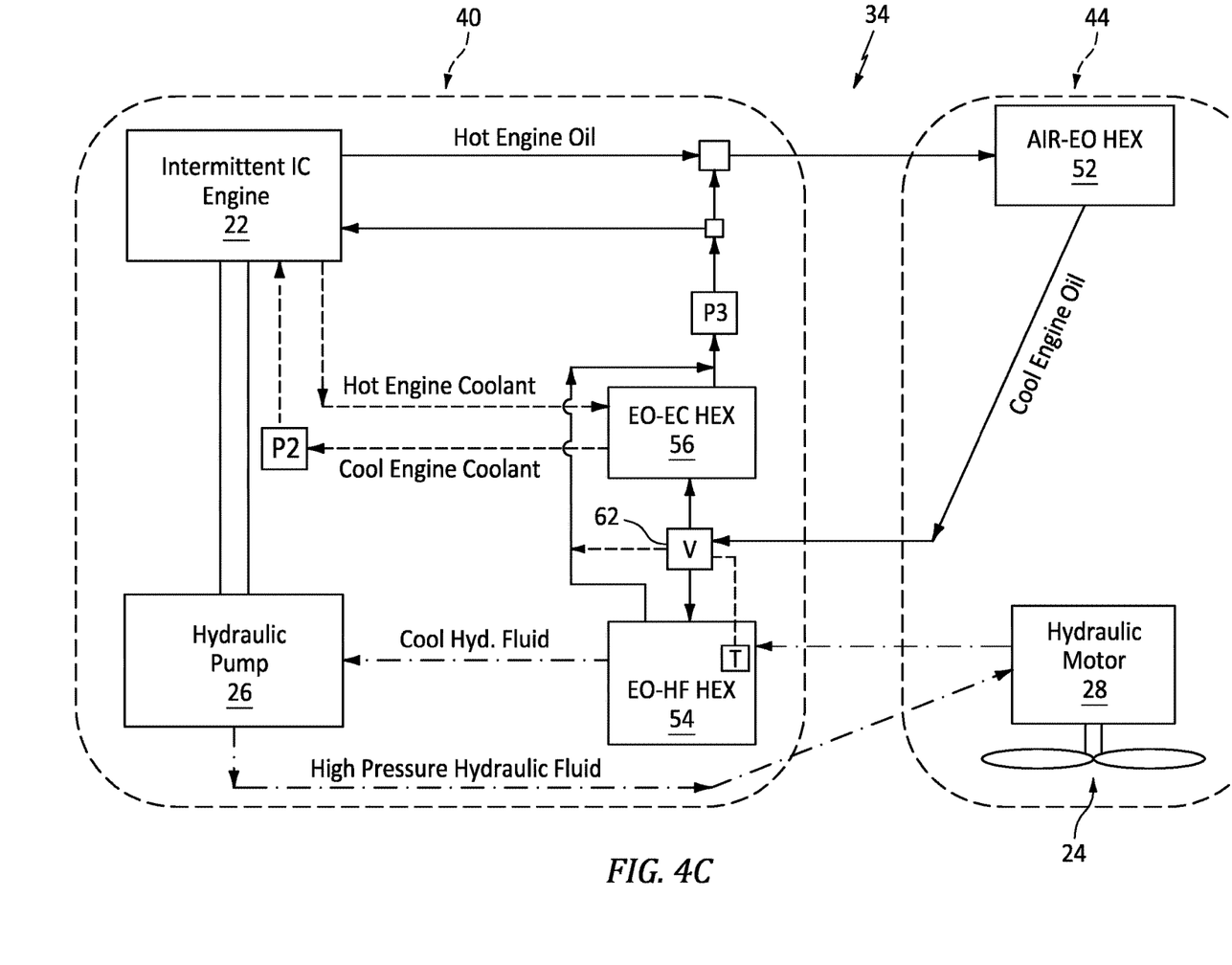
FIG. 4C is a schematic illustration of a cooling system embodiment.
Figure 4D:
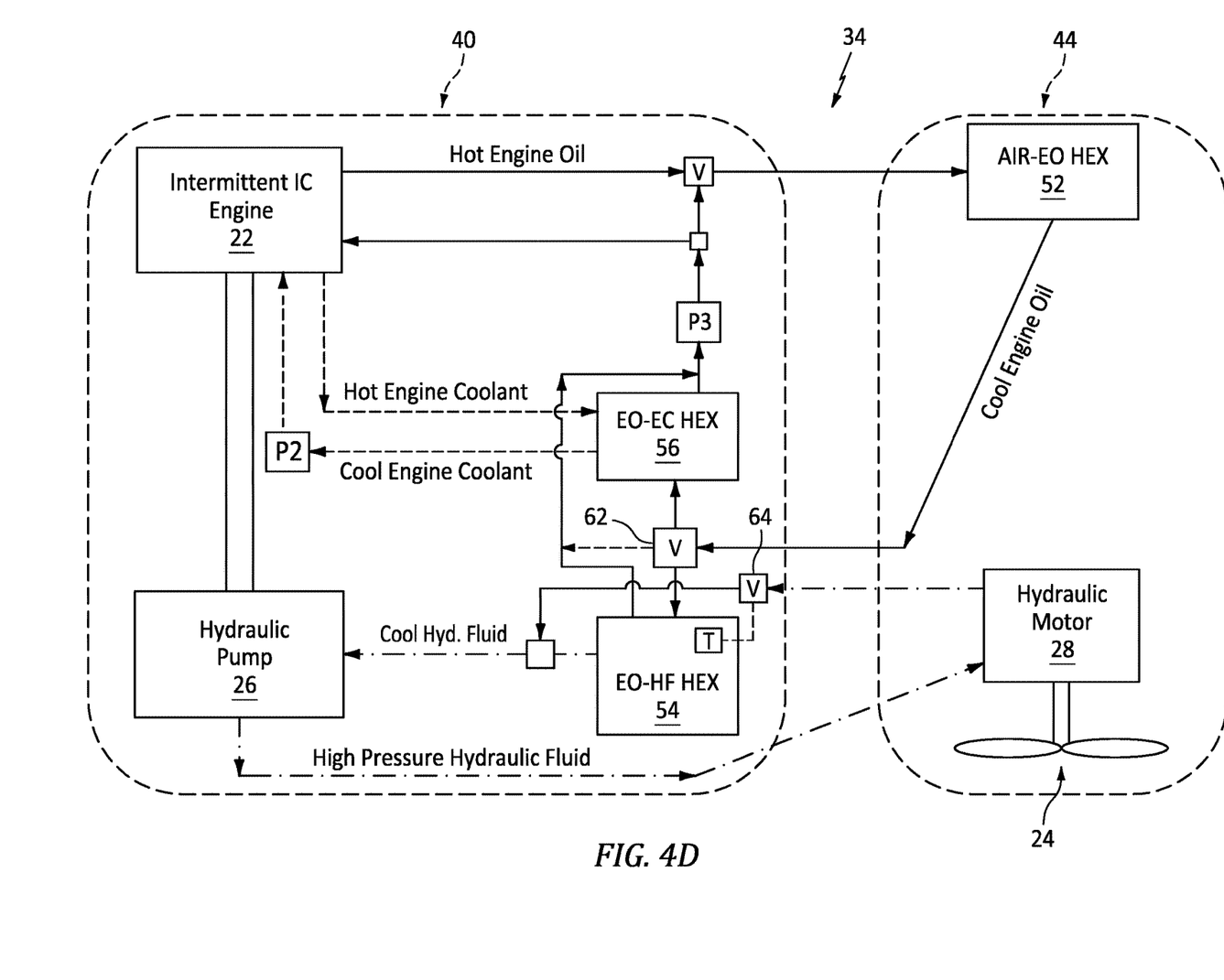
FIG. 4D is a schematic illustration of a cooling system embodiment.

In FIG. 4C, the structure is substantially the same as that shown in FIG. 4 with the exception that the controllable valve 62 that controls the relative flows of engine oil to the EO-HF HEX 54 and the EO-EC HEX 56 may be controllable based on a temperature. For example, the valve 62 may be controllable to limit or prevent the flow of engine oil through the EO-HF HEX 54 under operating conditions when it is desirable to allow the hydraulic fluid to increase in temperature. If a mode of operation is such that engine oil flow to the EO-HF HEX 54 is limited, the system may be configured such that all the engine oil not passing through the EO-HF HEX 54 passes through the EO-EC HEX 56 or only some amount, with the remainder bypassing the EO-EC HEX 56 (bypass shown in dashed line).

The valving diagrammatically shown in the system embodiments shown in FIGS. 4-4C illustrate that the flow of engine oil through the EO-HF HEX 54 and the EO-EC HEX 56 can be selectively controlled. This selective control can be used to provide a desired flow rate for cooling purposes and for other beneficial reasons such as controlling the frictional or viscous losses in the engine oil circuit, judicious use of pumping power, and the like. In addition, the system embodiments shown in FIGS. 4-4C show the engine oil exiting the EO-HF HEX 54 bypassing the EO-EC HEX 56. This parallel configuration is not required but may be desirable to minimize frictional or viscous losses in the engine oil circuit, judicious use of pumping power, and the like.

In some embodiments, the valve 62 on the engine oil circuit can be replaced with a restriction causing a pressure difference across it and across the EO-HF HEX 54, in which case the flow of oil through the EO-HF HEX 54 would not be controlled, and a thermostatic valve on the hydraulic circuit could adjust the portion of the hydraulic fluid flow that is bypassing the EO-HF HEX 54.

Embodiments of the present disclosure may use a similar approach with respect to the hydraulic fluid circuit. For example, as shown in FIG. 4, the hydraulic fluid exiting the hydraulic motor 28 may pass directly to the EO-HF HEX 54. FIG. 4D illustrates an alternative embodiment wherein hydraulic fluid exiting the hydraulic motor 28 may be directed to a controllable valve 64 configured to control an amount of hydraulic fluid directed to the EO-HF HEX 54 and an amount of hydraulic fluid that is directed to bypass the EO-HF HEX 54. For example, in a first mode of operation, the valve 64 may be controlled to cause all of the hydraulic fluid to pass through the EO-HF HEX 54. In a second mode of operation, the valve 64 may be controlled to cause all of the hydraulic fluid to bypass the EO-HF HEX 54. In a third mode of operation, the valve 64 may be controlled to cause a portion of the hydraulic fluid exiting the hydraulic motor 28 to pass through the EO-HF HEX 54 and the remainder of the hydraulic fluid to bypass the EO-HF HEX 54. The controllable valve 64 may be based on a temperature input. For example, the valve 64 may be controllable to limit or prevent the flow of hydraulic fluid through the EO-HF HEX 54 under operating conditions when it is not necessary to cool the hydraulic fluid, etc. and for the system efficiency reasons described above.

It should be noted that the system embodiments diagrammatically shown in FIGS. 4-4D are examples of how the present disclosure system may be configured. These examples are provided to illustrate the utility of the present disclosure and the present disclosure is not limited to these specific embodiments. For example, aspects described in these embodiments and elsewhere in the present application may be combined, or aspects may be omitted and still be within the intended scope of the present disclosure.

In some embodiments, the system may include a pump P3 in communication with a flow of engine oil exiting the EO-EC HEX 56 (and bypass engine oil if present). The engine oil flow exiting the pump P3 may be directed to back to the AIR-EO HEX 52. For example, the volumetric flow rate of the engine oil required for the intermittent IC engine may be less than that which is collectively passed through the EO-HF HEX 54 and the EO-EC HEX 56. The engine oil flow may be controlled to pass the desired engine oil volumetric flow rate through the intermittent IC engine 22 and the remainder directed to the AIR-EO HEX 52. Hence, in this example, a first parallel path may have engine oil passing from the intermittent IC engine 22 to the AIR-EO HEX 52, then to the EO-HF HEX 54, then through the EO-EC HEX 56, through pump P3, then back to the intermittent IC engine 22. The second parallel path may have engine oil passing from the AIR-EO HEX 52, then to the EO-EC HEX 56, through pump P3, then back to the AIR-EO HEX 52. A benefit of the exemplary parallel path configuration shown in FIG. 4 is that the engine oil flow in the first parallel path may be controlled differently from the engine oil flow within the second parallel path. For example, depending on system requirements, it may be advantageous to use a volumetric fluid flow rate in the first parallel path that is different (e.g., greater or lesser) than the volumetric fluid flow rate in the second parallel path. The difference in volumetric flow rate may be dictated by the cooling requirements of the respective components. As another example, in some embodiments the first or second parallel flow path may include control devices (e.g., valving actuable as a function of engine oil temperature—"T", etc.) not present in the other of the first or second parallel flow path, or both parallel flow paths may include flow control devices configured for different fluid flow parameters. As an example, in some applications it may be advantageous to limit or stop engine oil flow from the intermittent IC engine 22 when ambient conditions are low temperature. Once the engine oil has heated (as sensed by a thermostat), a control valve may open to allow some amount of engine oil flow within the path. In other words, present disclosure system embodiments having such parallel engine oil flow paths may be advantageous to allow appropriate selectable cooling or warming of different parts of the system or to permit different engine oil flow volumetric rates through different system components.

As stated above, the IC engine cooling system circulates engine coolant fluid through engine components (e.g., block, cylinder heads, etc.) during operation. Embodiments of the present disclosure cooling system 34 may include transferring engine coolant fluid from the intermittent IC engine 22 to the engine oil/engine coolant heat exchanger (EO-EC HEX 56) where the engine oil operates to cool (i.e., remove thermal energy from) the engine coolant fluid. After leaving the EO-EC HEX 56, the engine coolant fluid is transferred back to the intermittent IC engine 22 to repeat the cycle. As stated above, the engine coolant fluid circuit may include a pump ("P2") to provide motive force to the engine coolant fluid. The engine coolant fluid pump may be selectively controlled to vary the volumetric flow rate/velocity and/or the pressure of the engine coolant fluid through the engine coolant fluid circuit. FIG. 3 schematically depicts the pump P2 as being disposed upstream of the intermittent IC engine 22 (i.e., coolant travels from the pump P2 to the intermittent IC engine 22), but the present disclosure system 20 is not limited to this or any engine coolant fluid pump location. In some embodiments, the system 20 may include more than one pump in the engine coolant fluid circuit and may include valving for controlling the volumetric flow rate/velocity and/or the pressure of the engine coolant fluid within the engine coolant fluid circuit.

The present disclosure system, including the embodiments described herein as well as other embodiments thereof, leverages the differing maximum temperature limits of system fluids (e.g., engine oil, hydraulic oil, and engine coolant fluid) to permit relative cooling. For example, in the embodiment described above and shown in FIG. 3, the present disclosure system utilizes the engine oil as a cooling fluid for the hydraulic fluid and also the engine cooling fluid (if an EO-EC HEX is included) and thereby leverages the higher temperature limit of the engine oil. In this manner, the present disclosure obviates the need for routing more than one fluid to ambient air heat exchangers, likely decreases the complexity of the system 20, and decreases the weight of the system 20.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An aircraft propulsion system, comprising: at least one hydraulic pump; at least one intermittent internal combustion (IC) engine configured to drive the at least one hydraulic pump; at least one hydraulic motor in communication with the at least one hydraulic pump and configured to drive at least one propulsor fan; at least one engine oil pump; and a cooling system that includes fluid-air heat exchanger (AIR-EO HEX) configured to transfer thermal energy between a flow of an engine oil and a flow of ambient air, and a first fluid-to-fluid heat exchanger (EO-HF HEX) configured to transfer thermal energy between the flow of the engine oil and a flow of a hydraulic fluid; wherein the at least one hydraulic pump is sized to power the at least one hydraulic motor with the hydraulic oil, and to provide sufficient motive force to the hydraulic oil to cause the hydraulic oil to pass through the at least one hydraulic motor and the EO-HF HEX and back to the at least one hydraulic pump; wherein the at least one engine oil pump is sized to provide sufficient motive force to the engine oil to pass the engine oil to and through the AIR-EO HEX, and thereafter to and through the EO-HF HEX, and thereafter to and through the intermittent IC engine; a second fluid-to-fluid heat exchanger (EO-EC HEX) configured to transfer thermal energy between the flow of the engine oil and a flow of an engine coolant; and at least one engine coolant pump; wherein the at least one engine coolant pump is configured to provide motive force to pass the engine coolant to and through the EO-EC HEX, and to and through the intermittent IC engine; and wherein the motive force provided to the engine oil produced by the at least one engine oil pump is sufficient to pass the engine oil to and through the EO-EC HEX, and thereafter to pass the engine oil to and through the intermittent IC engine.

2. The aircraft propulsion system of claim 1, wherein the AIR-EO HEX is configured such that both the engine oil and the ambient air pass through the AIR-EO HEX, and the AIR-EO HEX is configured to transfer thermal energy from the engine oil to the ambient air.

3. The aircraft propulsion system of claim 1, wherein the EO-HF HEX is configured such that both the engine oil and the hydraulic fluid pass through the EO-HF HEX, and the EO-HF HEX is configured to transfer thermal energy between the hydraulic fluid and the engine oil.

4. The aircraft propulsion system of claim 1, wherein the AIR-EO HEX is sized such that the thermal energy transferred between the flow of the engine oil and the flow of the ambient air is sufficient to permit the engine oil to perform as a coolant within the EO-HF HEX.

5. The aircraft propulsion system of claim 1, wherein the AIR-EO HEX is sized such that the thermal energy transferred between the flow of the engine oil and the flow of the ambient air is sufficient to permit the engine oil to perform as a coolant within the EO-EC HEX.

6. The aircraft propulsion system of claim 1, wherein the AIR-EO HEX is sized such that the thermal energy transferred between the flow of the engine oil and the flow of the ambient air is sufficient to permit the engine oil to perform as a coolant within the EO-HF HEX.

7. An aircraft propulsion system, comprising:
at least one hydraulic pump;
at least one intermittent internal combustion (IC) engine configured to drive the at least one hydraulic pump;
at least one hydraulic motor in communication with the at least one hydraulic pump and configured to drive at least one propulsor fan;
at least one engine oil pump configured to pump an engine oil; and
a cooling system that includes:
a fluid-air heat exchanger (AIR-EO HEX) configured to transfer thermal energy between the engine oil and a flow of ambient air;
a first fluid-to-fluid heat exchanger (EO-HF HEX) configured to transfer thermal energy between the engine oil and a flow of a hydraulic fluid;
a second fluid-to-fluid heat exchanger (EO-EC HEX) configured to transfer thermal energy between the engine oil and a flow of an engine coolant;
wherein the at least one hydraulic pump is configured to provide the hydraulic oil to the at least one hydraulic motor sufficient to drive the at least one hydraulic motor, and to provide sufficient motive force to the hydraulic oil to cause the hydraulic oil to pass through the at least one hydraulic motor and at least one EO-HF HEX and back to the at least one hydraulic pump; and
wherein the cooling system is configured such that a flow of the engine oil passes through the AIR-EO HEX, and a first portion of the engine oil flow selectively passes through the intermittent IC engine, wherein the first portion of the engine oil flow is less than the engine oil flow.

8. The aircraft propulsion system of claim 7, wherein the AIR-EO HEX is configured such that the thermal energy transferred between the engine oil flow and the flow of the ambient air is sufficient to permit the engine oil to perform as a coolant within the EO-HF HEX.

9. The aircraft propulsion system of claim 8, wherein the AIR-EO HEX is configured such that the thermal energy transferred between the engine oil flow and the flow of the ambient air is sufficient to permit the engine oil to perform as a coolant within the EO-EC HEX.

10. The aircraft propulsion system of claim 7, wherein the at least one engine oil pump includes a first engine oil pump configured to pump the first portion of the engine oil flow through the intermittent IC engine.

11. The aircraft propulsion system of claim 10, including a first valve configured to divert the first portion of the engine oil flow through the intermittent IC engine.

12. The aircraft propulsion system of claim 11, wherein the first valve is selectively controllable to regulate a volumetric flow rate of the first portion of the engine oil flow through the intermittent IC engine.

13. The aircraft propulsion system of claim 10, wherein the at least one engine oil pump includes a second engine oil pump configured to pump the engine oil flow exiting the EO-EC HEX.

14. The aircraft propulsion system of claim 13, including a second valve configured to selectively control the engine oil flow through the EO-HF HEX.

15. The aircraft propulsion system of claim 14, wherein the second valve is selectively controllable to divert a second portion of the engine oil flow to bypass the EO-HF HEX.

16. The aircraft propulsion system of claim 15, further including a thermostatic fluid control valve disposed to control engine oil flow through the EO-HF HEX.

17. A method of cooling components within an aircraft propulsion system, the aircraft propulsion system having a hydraulic pump, an intermittent internal combustion (IC) engine configured to drive the hydraulic pump, a hydraulic motor in communication with the hydraulic pump and configured to drive at least one propulsor fan, and at least one engine oil pump, the method comprising: using the at least engine oil pump to pump a flow of engine oil through a fluid-air heat exchanger (AIR-EO HEX) and a fluid-to-fluid heat exchanger (EO-HF HEX), wherein the AIR-EO HEX is configured to transfer thermal energy from the flow of engine oil to a flow of ambient air in communication with the AIR-EO HEX, and wherein the EO-HF HEX is configured to transfer thermal energy from a flow of a hydraulic fluid to the flow of engine oil; and using the hydraulic pump to power the hydraulic motor using the flow of hydraulic oil, and to pump the hydraulic oil through the EO-HF HEX and back to the hydraulic pump; and using the at least one engine coolant pump to pump engine coolant to and through a second fluid-to-fluid heat exchanger (EO-EC HEX) configured to transfer thermal energy between the flow of the engine oil and a flow of an engine coolant, and at least one engine coolant pump, and to and through the intermittent IC engine; and wherein the motive force provided to the engine oil produced by the at least one engine oil pump is sufficient to pass the engine oil to and through the EO-EC HEX, and thereafter to pass the engine oil to and through the intermittent IC engine.

18. The method of claim 17, wherein the AIR-EO HEX is configured such that the thermal energy transferred between the flow of the engine oil and the flow of the ambient air is sufficient to permit the engine oil to perform as a coolant within the EO-HF HEX and the EO-EC HEX.

* * * * *